June 24, 1930.  J. A. MACLEAN  1,767,219
UNIT LOCK NUT
Filed July 30, 1927
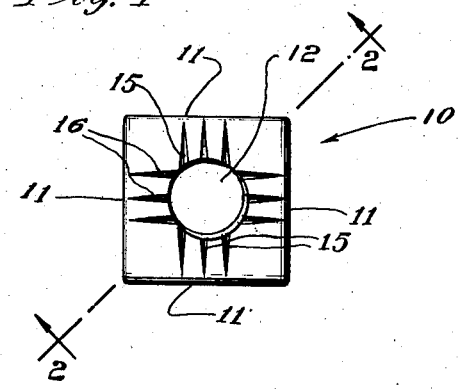
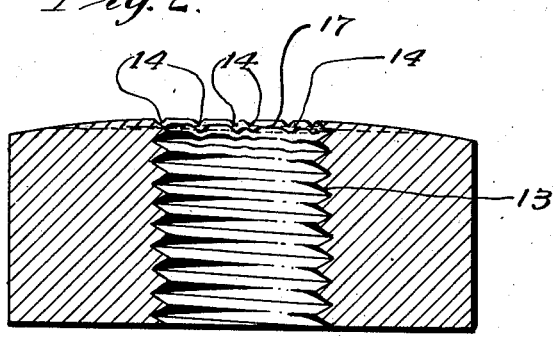
Inventor:
John A. MacLean
By: Williams, Bradbury,
McCaleb & Hinkle
Attys.

Patented June 24, 1930

1,767,219

UNITED STATES PATENT OFFICE

JOHN A. MacLEAN, OF CHICAGO, ILLINOIS, ASSIGNOR TO MacLEAN-FOGG LOCK NUT COMPANY, OF CHICAGO, ILLINOIS, A CORPORATION OF ILLINOIS

UNIT LOCK NUT

Application filed July 30, 1927. Serial No. 209,576.

The present invention relates to lock nuts and is more particularly concerned with nuts embodying unitary means for retaining the same upon a threaded member.

One of the objects of my invention is the provision of a lock nut embodying means for retaining the nut in locked position comprising a thread formed with a plurality of corrugations for frictional engagement with the threads upon a complementary member.

Another object of my invention is the provision of a novel method of manufacture of lock nuts employing the formation of a plurality of corrugations in one or more of the threads of the nut for frictional engagement with threads upon a complementary threaded member.

Other objects and advantages of my invention will appear more fully from the following description and from the accompanying drawings in which similar characters of reference indicate similar parts throughout the several views.

Referring to the drawings:—

Fig. 1 is a plan view of my unit lock nut.

Fig. 2 is an elevational cross-sectional view of the same on the lines 2—2 of Fig. 1.

Referring to Fig. 1, 10 indicates in its entirety my unit lock nut which may consist of a nut of conventional design having a plurality of plain sides 11 and a centrally located bore 12 preferably having its axis parallel to said sides. The bore 12 is threaded in the usual manner, forming a plurality of threads 13 which are adapted to fit the threads upon a complementary threaded member such as a bolt or rod.

While I have shown my lock nut embodied in a square nut, I desire it to be understood that my invention includes nuts of all kinds whether they be square, hexagonal or of other non-circular form, and I do not wish to be limited to the precise form shown.

The unit lock nuts which are the subject of the present invention are of particular advantage when used in railroad work as for fastening the bolted parts of freight and passenger cars and locomotives and for securing rails together as well as for securing many other structural elements and for this purpose the nut is generally of a size which is formed by forging or cold pressed process. After the nut has been threaded a plurality of corrugations are formed in the upper thread of the nut on the outer face, these corrugations serving to perform the locking function.

The corrugations are shown at 14 in Fig. 2 and they may be formed by placing a cold chisel, die, or other sharp instrument across the top of the nut and giving the instrument a sharp blow with a hammer or the like. This will form a plurality of narrow or V-shaped indentations or grooves 15 and 16 across the top of the nut and the protruding ridge 17 of the top thread will likewise have a plurality of similarly shaped corrugations 14 formed therein. If desired, all of the grooves 15 and 16 and corrugations 14 may be formed in a single operation by using an appropriate die. In forming the corrugations greater pressure is applied to the nut in the region of the threaded bore, so as to compress the upper three threads. I have found that at least three threads should be compressed to give proper action.

In order to form corrugations in the threads, it should be noted that the edge of the sharp instrument, used in forming the corrugations, should extend transversely to the threads, or substantially in the direction of diametrical lines, and the latter expression is used generically throughout the specification and claims to include deformations capable of producing such corrugations in the threads.

The operation of my lock nut is as follows. The nut may be threaded upon a bolt or other complementary threaded member in the usual manner and as the corrugated thread 17 is at the top of the nut, the nut will progress upon the bolt without resistance until it reaches the upper three compressed threads. The bolts are preferably made of but slightly greater length than required so that they protrude from the nut 10 for a slight distance and during the remainder of the threading operation the compressed threads are brought into engagement with the complementary threads on the bolt producing a frictional resistance which effectively holds the nut upon the bolt. The corrugations 14 may or may not be resilient, depending upon the type of material used in the nut, but it is found that these corrugations are a very effective and simple means of producing a lock nut which will not be dislodged by the vibration incident to railway traffic.

While I am aware that many lock nuts have been made which operate to permanently secure a nut upon a bolt, I am not aware that any lock nuts have been made embodying a corrugated thread for the purpose of performing this function. It should be noted that my lock nut may be removed from the bolt by the application of sufficient force and neither the removal nor the installation of my lock nut will injure the threads upon the bolt to any substantial degree. Consequently my unit lock nut may be employed several times, although with repeated use the binding properties of the nut may be expected to diminish.

While the lock nut described does not include any complicated structure, it should be noted that the corrugated thread employed is peculiarly effective in locking the nut on the bolt and the device has already been found to be of great practical benefit. One of the most important features of my invention is the simplicity of the structure which is required to perform this useful function.

While I have illustrated and described a specific embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a unit lock nut, a nut comprising a metal member having a plurality of flat sides and a bore centrally located between said sides, said bore being threaded, and certain of said threads having a plurality of sharp, narrow bends formed in the same to engage with the complementary threaded member and retain the nut in locked position.

2. In a unit lock nut, a nut comprising a metal member having a plurality of flat sides and a threaded bore centrally located between said sides, a plurality of relatively sharp, narrow depressions formed in one face thereof, and a portion of one of the threads adjacent that face of the nut and below each depression being depressed to form similarly shaped depressions therein.

3. In a unit lock nut, a nut comprising a metal member having a plurality of flat sides and a threaded bore centrally located between said sides, a plurality of relatively sharp, narrow, V-shaped depressions formed in one face thereof, and a portion of one or more of the threads adjacent that face of the nut, and below each depression being depressed to form similarly V-shaped depressions therein, whereby said depressed threads may frictionally engage with a bolt upon which the nut is threaded.

4. The method of forming a lock nut which consists in forming threads in a nut of conventional form, and in forming a plurality of substantially sharp and narrow corrugations in one face of said nut adjacent the threaded opening along lines extending substantially parallel to diametrical lines, by impact with a relatively sharp instrument with sufficient force to compress a plurality of the adjacent threads.

In witness whereof, I hereunto subscribe my name this 25 day of July, 1927.

JOHN A. MacLEAN.